Patented Dec. 8, 1942

2,304,168

UNITED STATES PATENT OFFICE 2,304,168

MAKING HYDROCARBON CONVERSION CATALYST

Llewellyn Heard, Hammond, Ind., assignor to Standard Oil Company, Chicago, Ill., a corporation of Indiana No Drawing. Application November 27, 1939, Serial No. 306,327

7 Claims. (Cl. 196—52)

This invention relates to making a hydrocarbon conversion catalyst and it pertains more particularly to the dehydrogenation of hydrocarbons or the reforming of naphtha.

An object of the invention is to produce a dehydrogenation or reforming (which term includes aromatization and isomerization) catalyst which can be used for a long period of time before it becomes deactivated by carbonaceous deposits. A further object is to prevent degradation of the hydrocarbon charging stock and consequent losses to gas and coke because of an initial super-activity which characterizes catalysts of this type. A further object is to increase the uniformity of catalytic activity over long periods of time and to decrease the frequency of regenerations and the amount of carbonaceous material which must be removed from the catalyst during regeneration.

A further object of the invention is to provide a dehydrogenation or reforming catalyst which can be used at temperatures of 600° to 1050° F., preferably about 950°–1000° F. for the conversion of normally liquid hydrocarbons without forming unduly large amounts of normally gaseous hydrocarbons. A further object is to provide a catalyst for reforming low knock rating naphtha which will give maximum yields of high octane number gasoline.

I have found that dehydrogenation or reforming catalysts of the active type tend to act too vigorously at the beginning of a run, producing unduly large amounts of normally gaseous hydrocarbons and unduly large amounts of carbonaceous materials. The latter, of course, accumulate on the catalyst and not only retard the activity of the catalyst but tend to promote the formation of more carbonaceous material.

Initial degradation of charging stock may be minimized by a preliminary treatment of the catalyst with hydrogen or with normally gaseous hydrocarbons such as butane or with mixtures thereof. In such preliminary treatments the catalyst is reduced and when the gaseous hydrocarbons are present there is a small carbonaceous deposit which apparently coats the over-active catalyst surfaces and tends to bring about more uniform dehydrogenation or reforming when the naphtha or other normally liquid feed stock is dehydrogenated or reformed. Such preliminary catalyst treatments may be employed in practicing my invention but when the over-active catalyst surfaces are coated with alumina the necessity and importance of such pre-treatments is considerably minimized.

My preferred dehydrogenation and reforming catalysts comprise compounds of group VI metals, chromium, molybdenum, tungsten and uranium. Certain other metals such as vanadium, cerium, thorium, etc. can be used in place of group VI metals. These metals may be used in metallic form or the form of their oxides (either alone or deposited on supports such as bauxite, alumina, etc.) or in anion form as chromites, molybdenites, etc. of metals such as magnesium, calcium, nickel, cobalt, etc. A preferred example of such dehydrogenation catalyst is magnesium chromite which may be prepared by heating hydrated metal ammonium chromate crystals. It should be understood, however, that the invention is applicable to any catalyst of the types above mentioned or to any equivalent thereof.

I have found that if a dehydrogenation catalyst is subsequently coated with a less active catalyst material, particularly with alumina, its character becomes markedly changed. The over-active "spots" of the catalyst appear to be selectively deactivated so that there is no longer the pronounced tendency toward initial degradation of stock and unduly heavy carbonaceous deposits. The yield of normally gaseous hydrocarbons is much lower and at the same time liquid products are obtained which are characterized by very high octane number.

My invention should not be confused with the idea of impregnating catalyst supports or of co-precipitating catalyst material on supports. If catalysts are coprecipitated, the over-active "spots" are not selectively inhibited, and the desired results are not obtained. The material deposited on the catalyst in accordance with my invention is not the dehydrogenating or reforming component of the mixture but is a restraining or inhibiting agent which is employed for preventing gas losses and carbonaceous deposits due to the over-active "spots" on the active catalyst components. This restraining or inhibiting agent may be applied in a film of molecular thinness,—in fact it may simply react with the catalyst material in the over-active "spots" to insure catalyst uniformity. I do not wish to be bound by any particular theory or explanation of the unexpected results obtained by the catalyst since the invention is directed to the method of preparing the catalyst. This invention will be more clearly understood from the following detailed description of a preferred embodiment.

Hydrated metal ammonium chromate crystals are prepared by mixing aqueous solutions of magnesium chloride or nitrate and ammonium chromate, allowing the solution to stand until the crystals have formed. These crystals grow quite rapidly to a considerable size and large crystals are desirable. The metal salt and ammonium chromate solutions are preferably quite concentrated and are mixed in stoichiometric proportions, although an excess of the ammonium chromate may be used. These relatively large crystals are filtered, washed and dried and gradually heated to temperatures which may range from about 400° F. to 1000° F. The magnesium chromite thus produced is in the form of black, rigid solids with a very high degree of porosity.

Magnesium chromite, as hereinabove prepared, is a very good dehydrogenation or reforming catalyst but it should be understood that other dehydrogenation or reforming catalysts may also be used in the practice of my invention. Molybdenum or chromium oxides fall in this category and excellent catalysts of this type may be prepared by impregnating Activated Alumina with about 2 to 6% of molybdenum oxide or with slightly larger amounts of chromium oxide. When any of these catalysts are employed at temperatures of the order of 850 to 1025° F. there is an initial degradation of the charging stock accompanied by excessive carbonaceous deposits. I have found that such degradation and such carbon deposits can be minimized by subsequently treating the catalyst in the following manner:

The dehydrogenation or reforming catalyst of the type hereinabove mentioned is immersed in its oxidized state, i. e., the state in which it is prepared, in a dilute aqueous solution of a soluble aluminum salt such as $Al(NO_3)_3.9H_2O$. After thorough soaking the catalyst is drained, dried and heated to a temperature higher than that at which it is to be used, i. e., to a temperature of about 1050 to 1250° F. For example, 2.5 kilograms of $Al(NO_3)_3.9H_2O$ are dissolved in enough distilled water to make 100 liters of solution. 50 liters of catalyst material are immersed in this solution and gently agitated for a relatively short period of time and allowed to stand for about an hour at room temperature after which the liquid is drained from the impregnated solids and the solids are dried at 225° F. Finally the dried solids are heated to a temperature of 1200° F. for a period of about 1 hour. The catalyst material is now ready for use and the remarkable and unexpected properties of the catalyst will be apparent from the following example of such use:

A low knock rating heavy naphtha (commonly known as mineral spirits) was contacted with the above catalyst at a temperature of 1000° F. at about atmospheric pressure at a space velocity of about 1 volume of liquid feed per volume of catalyst space per hour, and the run was continued for a period of 5 hours. The volume yield of liquid products from this treatment was over 93% of the volume of stock charged and the knock rating of the liquid products was 19 octane numbers higher than the knock rating of the charging stock. A most striking feature of this run was the low amount of normally gaseous hydrocarbons produced, particularly during the initial stages of treatment. A coprecipitated catalyst, even when used at lower temperature, gave a slightly lower product yield and approximately the same octane number increase but produced about 40% more gas than was produced by the improved catalyst hereinabove described. This greatly lowered gas production, of course, goes hand-in-hand with lower carbonaceous deposits on the catalyst and makes possible the use of longer catalyst holding times between regenerating periods. The actual increase in yield of liquid products, even though higher temperatures were employed, indicates how effectively the subsequent coating of the catalyst prevented initial degradation of charging stock. The index of refraction of the liquids produced by my improved catalyst is markedly different than that of the products produced by the use of a co-precipitated catalyst, indicating that my coated catalyst exhibits some specificity for olefinization, although it undoubtedly promotes aromatization in naphtha reforming processes.

While I have described a process using atmospheric pressure conditions and no added hydrogen it should be understood that the catalyst may be used in the presence of added hydrogen and under pressures which may range from 0.2 to 50 atmospheres hydrogen partial pressure, but which are preferably below 20 atmospheres. The catalyst is generally used at temperatures of about 600° to 1050° F., preferably about 950 to 1000° F. Space velocities may range from .01 to 20 but are preferably about .05 to 2.0 volumes of liquid charge per volume of catalyst space per hour.

While I have described a specific example of the invention it should be understood that the invention is applicable to making other dehydrogenation catalysts than that specifically referred to in said example and that various modifications and changes may be made in the specific coating step.

I claim:

1. The method of conditioning dehydrogenation and hydrocarbon reforming catalysts which comprises treating said catalysts with a water soluble aluminum compound decomposable into alumina on heating, drying and heating to about 1050° to 1200° F., whereby over-active catalyst spots are deactivated by a coating comprising alumina.

2. The method of promoting catalyst life and decreasing the production of normally gaseous hydrocarbons in a catalytic hydrocarbon reforming process which comprises treating a hydrocarbon reforming catalyst with a solution of an aluminum compound decomposable into alumina on heating subsequent to the preparation of said catalyst, heating the treated catalyst to a temperature of about 1050 to 1250° F. to form an alumina coating on superactive catalyst spots, and treating a hydrocarbon oil with said coated catalyst at a temperature of about 850 to 1025° F.

3. The method of decreasing gas formation and carbon deposition in processes employing dehydrogenation and hydrocarbon reforming catalysts, which method comprises treating said catalysts with a solution of an aluminum compound decomposable into alumina on heating, heating the treated catalyst to a temperature of about 1050 to 1200° F. prior to using said catalyst for hydrocarbon conversion whereby an alumina coating is formed on super-active catalyst spots, and treating a hydrocarbon oil with said coated catalyst at a temperature of about 850 to 1025° F.

4. The method of making a catalyst for hydrocarbon conversion processes which comprises heating crystals of hydrated magnesium ammonium chromate to dispel all water and ammonia and to convert the crystals into solid magnesium chromite, treating said magnesium chromite with an aqueous solution of an aluminum salt and subsequently decomposing the aluminum salt by heating.

5. The method of claim 1 wherein the dehydrogenation and hydrocarbon reforming catalysts contain a compound of a group VI metal.

6. The method of claim 2 wherein the hydrocarbon reforming catalyst contains a compound of a group VI metal.

7. The method of claim 3 wherein the dehydrogenation and hydrocarbon reforming catalysts contain a compound of a group VI metal.

LLEWELLYN HEARD.